M. R. BUCKLEY.
FILTER.
APPLICATION FILED JAN. 2, 1912.
1,034,194.
Patented July 30, 1912.
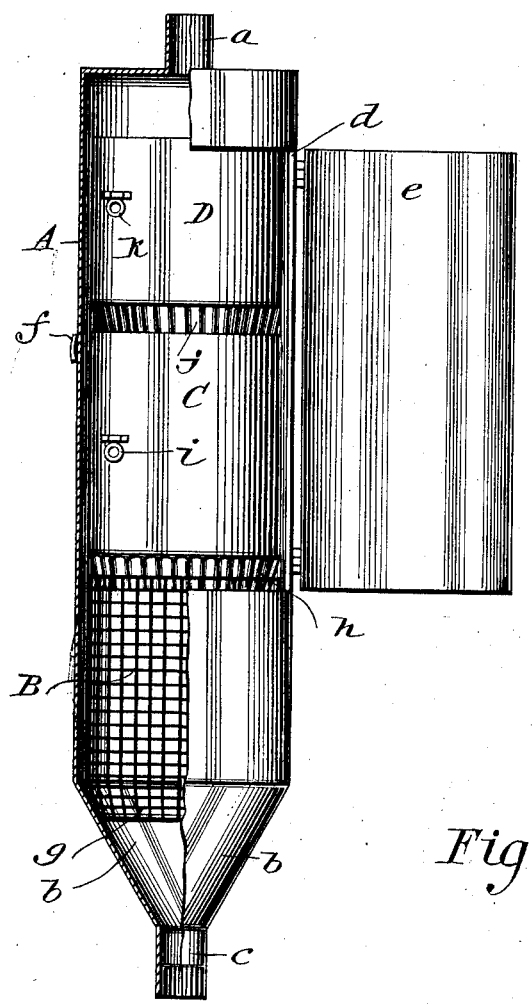
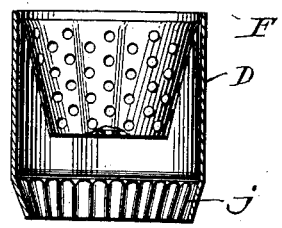
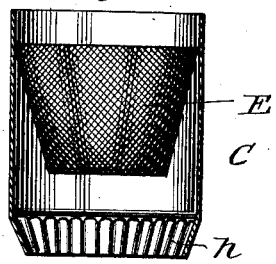
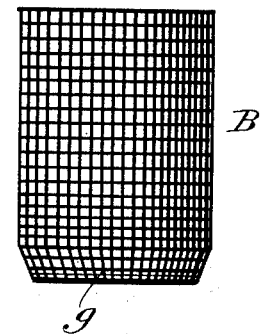
WITNESSES
Philip E. Barnes
Edna J. Sheehy
INVENTOR
Minerva R. Buckley
by James J. Sheehy & Co. Attorneys
COLUMBIA PLANOGRAPH CO., WASHINGTON, D. C.

UNITED STATES PATENT OFFICE.

MINERVA R. BUCKLEY, OF CHERRYVALE, KANSAS.

FILTER.

1,034,194.  Specification of Letters Patent.  Patented July 30, 1912.

Application filed January 2, 1912. Serial No. 668,887.

*To all whom it may concern:*

Be it known that I, MINERVA R. BUCKLEY, citizen of the United States, residing at Cherryvale, in the county of Montgomery and State of Kansas, have invented new and useful Improvements in Filters, of which the following is a specification.

My present invention pertains to filters and more particularly to filters of the cistern-supply type; and it has for its object to provide a simple and efficient filter, of the kind stated, and one that is adapted by reason of the construction and relative arrangement of its parts, to be expeditiously and thoroughly cleared of collected sediment or foreign matter deposited in it by the passing water.

The invention in all of its details will be fully understood from the following description and claim when the same are read in connection with the drawings, accompanying and forming part of this specification, in which:

Figure 1 is a vertical section illustrating my novel filter complete and ready for use. Figs. 2, 3 and 4 are detail views illustrative of the three removable members of the filter.

Similar letters of reference designate corresponding parts in all of the views of the drawings.

Among other elements my novel filter comprises a casing A that is preferably, though not necessarily, of circular form in cross-section. The said casing is provided at its upper end with a short pipe section $a$, and its lower end portion $b$ is tapered and terminates in a nipple $c$. The pipe section $a$ is designed to be connected with a pipe (not shown) that leads from a house-top, and the nipple $c$ is connected with a pipe (also not shown) that extends to a cistern or the like. In its upper portion the casing A is provided with an opening $d$. This opening is normally closed by a hinged door $e$ which is secured against casual opening by a fastener $f$.

Removably arranged in the casing A are a basket B, and two tubular members lettered C and D, respectively. The basket B which also constitutes one of the removable members of the filter, is closed at its bottom and sides and is open at its top. Said basket B is formed of wire or other suitable material in reticulated form, is tapered at its lower end, as indicated by $g$, so as to rest in and be supported by the tapered portion $b$ of casing A, and is designed to be filled with charcoal or other suitable filtering material. The lower tubular member C is tapered at its lower end, as indicated by $h$, so as to rest in and be supported by the basket or member B, and is provided with a handle $i$, through the medium of which it may be readily placed in and removed from the casing A. In the said member C is fixed a strainer E. This strainer is preferably made of brass wire, and in the form of an inverted truncated cone, it being closed at its bottom and side or sides and open at its top, and being fixedly connected at its upper edge to the inner side of the member C, which is preferably made of sheet-metal. The member D is tapered at its lower end, as indicated by $j$, so as to rest in and be supported by the upper end of the member C, and said member D is also provided with a handle $k$ for use in putting it in and taking it out of the casing A. In the member D is arranged a foraminous strainer F, which, like the strainer E, is in the form of an inverted truncated cone and is closed at its bottom and side or sides and open at its upper end. The said strainer F is fixed at its upper edge to the inner side of the member D which is preferably of sheet-metal. I would here have it understood that when I state that the strainer E and the strainer F are respectively closed at their bottoms and sides, I mean to convey the meaning that the bottom and side of the strainer E are formed of reticulated wire, and the bottom and side of the strainer F are formed of tin or other suitable sheet-metal provided with foraminations. I would also have it understood that it is unnecessary to provide the member or basket B with a handle, inasmuch as a finger of the operator can be placed in one of the interstices of the basket or member B incidental to placing the said basket or member B in or removing the same from the filter.

In the practical use of my novel filter, the basket or member B is charged with charcoal or other suitable filtering material, and is introduced into the casing A through the opening $d$, and adjusted to position on the tapered portion $b$ of said casing. The tubular member C is then placed in the casing through the opening $d$ thereof, and is supported by reason of its lower tapered end $h$ being positioned in and on the upper end of the basket B. The member D is introduced into the casing in the same manner as the member C, and is supported in and on the upper end of the latter. The door *e* of the casing is then swung closed, and is secured in a closed position by the fastener *f*.

When during a rainstorm or at any other time water is supplied to the pipe section *a*, the water will pass from said pipe section *a* through the strainers F and E, and the charcoal in the basket B, in the order named, whereupon the strainer F will catch and hold large particles of foreign substance that may be present in the water, the strainer E will catch and hold smaller particles of foreign substance in the water, and the charcoal in the basket B will free the water of all impurities that remain therein subsequent to the passage through the strainers F and E, with the result that the water supplied through the nipple *c* to a cistern or the like will be perfectly pure.

When it is necessary to clean the filter, the door *e* is opened, and the members D, C and B are manipulated and removed through the door opening *d*, in the order named. With this done it will be observed that all of the members may be dumped to discharge the same of their contents, and may then be expeditiously and thoroughly cleaned, whereupon the member or basket B may be charged with fresh charcoal, and then replaced in the casing A together with the members C and D, after which the door *e* is closed and secured in closed position.

Having described my invention, what I claim and desire to secure by Letters-Patent, is:

A filter comprising a casing having an inlet at its upper end and a downwardly tapered lower portion that terminates in an outlet and also having an opening in the upper portion of its side and a door for closing said opening, a basket of reticulated material removably arranged in the lower portion of the casing and having a tapered lower end adapted to rest in and be supported by the tapered lower portion of the casing, a tubular member removably arranged in the casing and having a tapered lower end resting in and supported by the upper end of the basket, a strainer arranged in said tubular member, and a second tubular member removably arranged in the casing and having a tapered lower end removably arranged in and on the upper end of the first-named tubular member; said second and upper tubular member being provided with a strainer the openings of which are larger than the openings in the strainer of the first-named tubular member.

In testimony whereof I have hereunto set my hand in presence of two subscribing witnesses.

MINERVA R. BUCKLEY.

Witnesses:
E. F. HILEMAN,
W. E. H. ANDERSON.

---

Copies of this patent may be obtained for five cents each, by addressing the "Commissioner of Patents. Washington, D. C."